(12) United States Patent
Joseph et al.

(10) Patent No.: US 11,615,428 B1
(45) Date of Patent: Mar. 28, 2023

(54) ON-DEMAND ESTIMATION OF POTENTIAL CARBON CREDIT PRODUCTION FOR A FORESTED AREA

(71) Applicant: Natural Capital Exchange, Inc., San Francisco, CA (US)

(72) Inventors: Max Joseph, Denver, CO (US); Zack Parisa, Piedmont, CA (US); Joe Shannon, Houghton, MI (US); Nathan Rutenbeck, Brooklin, ME (US); Anne Pond, Albuquerque, NM (US); Gordon Vermeer, Minneapolis, MN (US)

(73) Assignee: Natural Capital Exchange, Inc., San Francisco, CA (US)

( * ) Notice: Subject to any disclaimer, the term of this patent is extended or adjusted under 35 U.S.C. 154(b) by 0 days.

(21) Appl. No.: 17/568,142

(22) Filed: Jan. 4, 2022

(51) Int. Cl.
| | |
|---|---|
| *G06Q 10/10* | (2012.01) |
| *G06Q 10/06* | (2012.01) |
| *G06Q 30/02* | (2012.01) |
| *G06Q 30/06* | (2012.01) |
| *G06Q 30/018* | (2023.01) |
| *G06N 7/00* | (2023.01) |

(52) U.S. Cl.
CPC .......... *G06Q 30/018* (2013.01); *G06N 7/005* (2013.01)

(58) Field of Classification Search
CPC .............................. G06Q 30/018; G06N 7/005
USPC ................................................... 705/1.1–912
See application file for complete search history.

(56) References Cited

U.S. PATENT DOCUMENTS

| | | | |
|---|---|---|---|
| 5,857,169 A | 1/1999 | Seide | |
| 5,886,662 A | 3/1999 | Johnson | |
| 9,007,256 B1 | 4/2015 | Ambusk | |
| 11,010,777 B1 | 5/2021 | Lee | |
| 2005/0192760 A1 | 9/2005 | Dunlap | |
| 2005/0273358 A1* | 12/2005 | Zimmerman | G06Q 10/30 705/308 |
| 2007/0061076 A1 | 3/2007 | Shulman | |
| 2007/0265781 A1 | 11/2007 | Nemethy et al. | |
| 2008/0133195 A1 | 6/2008 | Rahmes et al. | |

(Continued)

FOREIGN PATENT DOCUMENTS

| | | |
|---|---|---|
| CN | 103940389 A | 7/2014 |
| CN | 107229991 A | 8/2020 |

OTHER PUBLICATIONS

"Forest Management under Fire Risk when Forest Carbon Sequestration Has Value", TSE Working Paper Series 09-005; Research Group: Environmental Economics and Natural Resources, 30 pages, (2009).

(Continued)

*Primary Examiner* — Jonathan P Ouellette
(74) *Attorney, Agent, or Firm* — David J. Thibodeau, Jr.; VLP Law Group, LLP

(57) ABSTRACT

A carbon credit generation methodology that uses a base map and other spatially explicit data to develop a baseline scenario for a forested property. One or more alternate scenarios are compared against the baseline scenario. The alternate scenario may for example include harvest deferral, alternate forest management, and.or reforestation. The effect of implementing the alternate scenario for a future activity period is modeled to determine potential carbon credit production prior to committing the property to the alternate scenario. The state of the property is confirmed at the end of the activity period before verified carbon credits are issued.

20 Claims, 7 Drawing Sheets

(56) References Cited

U.S. PATENT DOCUMENTS

| | | |
|---|---|---|
| 2008/0275746 A1 | 11/2008 | Musier et al. |
| 2009/0105954 A1 | 4/2009 | Van Workum et al. |
| 2009/0228320 A1 | 9/2009 | Teresa et al. |
| 2009/0287543 A1 | 11/2009 | Allderdice et al. |
| 2009/0292617 A1 | 11/2009 | Buchanan et al. |
| 2009/0313145 A1 | 12/2009 | Pickover et al. |
| 2010/0030608 A1 | 2/2010 | Kaminsky et al. |
| 2010/0040260 A1 | 2/2010 | Kelle et al. |
| 2010/0107171 A1 | 4/2010 | Amsterdam et al. |
| 2010/0250482 A1 | 9/2010 | Ma |
| 2011/0015973 A1 | 1/2011 | Benjamin |
| 2011/0150290 A1 | 6/2011 | Welty |
| 2012/0095897 A1 | 4/2012 | Barrow |
| 2014/0019179 A1 | 1/2014 | Gosalvez et al. |
| 2014/0081579 A1* | 3/2014 | Tyburski ............... G06Q 40/04 702/19 |
| 2014/0163781 A1 | 6/2014 | Vian et al. |
| 2014/0164070 A1* | 6/2014 | Smith ............ G06Q 10/06375 705/7.37 |
| 2015/0161574 A1 | 6/2015 | Feast et al. |
| 2016/0292626 A1 | 10/2016 | Green et al. |
| 2019/0005578 A1 | 1/2019 | Gagne |
| 2020/0284600 A1 | 9/2020 | Gomila et al. |
| 2022/0138649 A1* | 5/2022 | Ashtekar ............... A01B 79/00 705/7.36 |

OTHER PUBLICATIONS

Prestemon, et al., "Linking Harvest Choices to Timber Supply", Forest Science, vol. 46 (3), 13 pages, (2000).

Parisa et al., "Forests and Carbon A Guide for Buyers and Policymakers", NCX, Version 0.4, 30 pages (2020).

* cited by examiner

| Input | Symbol | General Harvest Model Term (Eq. 1) | Source |
|---|---|---|---|
| Stand volume (tons ABG C) | $C_{ABG}$ | Non-timber value ($V_{NT}$) | Prestemon & Wear 2000 |
| Stand Value, $T_0$ ($/ac) | $V_{T0}$ | Timber value ($V_T$) | Prestemon & Wear 2000 |
| Stand Value, $T_1$ ($/ac) | $V_{T1}$ | Timber value ($V_T$) | Prestemon & Wear 2000 |
| Proximity to Mill | $D_M$ | Proximity to Mill | Pokharel & Latta 2020 |
| Slope (percent) | $S$ | Harvest cost ($C_H$) | |
| Distance to Road | $D_R$ | Harvest cost ($C_H$) | Prestemon & Wear 2000; Pokharel & Latta 2020 |
| Legally Prohibited | $A_X$ | Group (G) | |
| State-level proportion of harvested acres from NWOS | NWOS | Group (G) | Butler et al. 2020 |
| Landowner Type | O | Group (G) | Sass et al. 2020 |
| Forest Type | F | Group (G) | FIADB FLDTYPCD |
| Forest Class (hardwood/softwood) | $F_C$ | Group (G) | FIADB |

FIG. 5

| Variable | General Harvest Model Term | Citation (if applicable) | Example of variable inputs |
|---|---|---|---|
| Standing timber volume | Non-timber value | Prestemon & Wear (2000) | Inventory data |
| Present standing timber value | Timber value | Prestemon & Wear (2000) | Inventory data, Pricing data (e.g. published public stumpage values, price indices, Timber-Mart South data) |
| Discounted future standing timber value | Timber value | Prestemon & Wear (2000) | Inventory data, pricing data (e.g. published public stumpage values, price indices, Timber-Mart South data) |
| Proximity to roads (road construction cost) | Cost of harvest | Prestemon & Wear (2000); Pokharel & Latta (2020) | Public geospatial data |
| Proximity to mills (transportation cost) | Cost of harvest | Pokharel & Latta (2020) | Public or private dataset (e.g. Forisk Mills Database, Latta et al. 2018 database) |
| Stand slope | Cost of harvest | | public geospatial data |
| Historical harvest and disturbance information | Group | | USFS FIA |
| Ownership type | Group | Prestemon & Wear (2000); Zhang et al (2015) | USFS FIA |
| Landowner attributes (e.g. size of property) | Non-timber value, Group | Butler et al (2020) | NWOS |

FIG. 6

| Parameter | Description |
|---|---|
| $P_{pa,t,i}$ | Area of participating property, i, during activity period, t; |
| TYC | Ton year accounting conversion |
| E | Price elasticity of demand |
| e | Price elasticity of supply |
| y | Substitution parameter |
| φ | percent |
| Cn | Carbon sequestration reversal per unit of harvest from the non-reserved forest |
| Cr | Carbon sequestration reversal per unit of deferred gained by preserving the reserved forest |
| ri | Fraction of total carbon contained in above ground live tree biomass removed in the baseline scenario for property i, as determined through the procedure |
| $PP\ C\ t0,i$ | Above ground live tree biomass at participating property, i, at the beginning (t0) of activity period, t |
| $PP\ C\ t1,i$ | Above ground live tree biomass at participating property, i, at the end (t1) of activity period, t |
| $Q_{p,t}$ | Quantity of merchantable timber that would have been harvested in the program area during the activity period, t |
| $Q_{m,t}$ | Quantity of merchantable timber supply remaining in the market during activity period, t |

FIG. 7

ON-DEMAND ESTIMATION OF POTENTIAL CARBON CREDIT PRODUCTION FOR A FORESTED AREA

TECHNICAL FIELD

This patent relates generally to techniques for on-demand estimation of potential carbon credit production, such as for a forested area.

BACKGROUND

Global enthusiasm for using natural climate solutions to fight climate change is on the rise, with research showing nature-based strategies could accomplish about a third of the emissions reductions needed to reach the Paris 2-degrees-Celsius target. Forest-based solutions account for the lion's share of this total potential, leading to bold initiatives like the World Economic Forum's "One Trillion Trees" initiative. Across the globe, policymakers, companies, and NGOs are rushing to find shovel-ready forest projects that can create Real, Immediate, Scalable, and Efficient (RISE) climate impact.

Forest carbon strategies have massive potential, but there are several known pitfalls that can dramatically reduce their effectiveness. Currently, two of the main forest carbon strategies in the US are afforestation and the CARB (California Air Resources Board) Forest Offset Protocol—both of which are well-intentioned but suffer from structural issues which reduce their RISE impact. Afforestation, or planting trees on previously unforested land, takes decades to sequester meaningful amounts of carbon. The CARB protocol, under which over a billion dollars worth of forest carbon credits have been traded, may be vulnerable to adverse selection and other issues stemming from its design.

Over the next few decades, hundreds of billions of dollars will be spent fighting climate change with the express goal of reducing future costs to society, and a significant portion will be directed to forest-based strategies.

To credibly issue carbon offsets that have value, a project needs to prove it will actually reduce emissions. The amount of CO2 being kept out of the atmosphere also needs to be accurately measured. These obligations require well-documented record keeping and protocols, as well as a trusted way to verify that a project performs as it claims.

US Patent Publication 2014/009179 entitled "Forestry and Urban Project Tracking" describes forestry tools and business intelligence techniques to provide insight into urban forestry projects. In an aspect, the tools enable urban forest project owners to capitalize on project offset credits as a revenue source. In another aspect, such tools can provide a variety of different analyses, from canopy analyses to tree health analysis, to work order generation, to carbon offset calculations. Particular embodiments can calculate carbon offsets using accepted standards, to allow a project owner to quickly and easily establish the amount of offsets to which the project is entitled.

US Patent Publication 2013/0211721 entitled "Forest Inventory Assessment Using Remote Sensing Data" (Yale University) describes methods and systems to inventory a plot of trees based on data including one or more (e.g., all) of radar images of the plot, spectral images of the plot (e.g., high resolution images taken by satellite), other data (e.g., elevation, slope, aspect), and actual tree survey data physically collected about the plot and/or another plot having similar characteristics.

SUMMARY

A highly targeted, short-term harvest deferral strategy, accessible to all landowners and underpinned by high-resolution forest data on every acre provides a novel solution to these problems. This solution would ensure that dollars flow to the right acres at the right time to change landowner behavior and create RISE climate impact.

One aspect is that credits generated through harvest deferral or other management changes should not be given trading value until after the outcome has actually been achieved and verified. Harvest deferrals, and any associated timber stock changes, should therefore be measured both at the beginning of a reporting period and verified at its end to determine how much carbon has been sequestered. On the other hand, project participants would prefer to know the value of their actions, ahead of making any commitments to defer a harvest or otherwise alter management plans. Ideally, then, a project participant is given a valuation of their efforts in real time, with minimal administrative overhead, using computerized automated tools as much as possible.

Briefly, a methodology for generating forest carbon credits that accomplishes these goals may start with a boundary description of a forested property. Other inputs include imagery of the forested property such as may be sourced from satellite imagery, and other spatially explicit data. From this information a base map is accessed for the property that contains information concerning the current carbon content of the property. A baseline scenario is then developed for the forested property that may be derived from a business as usual (BAU) statistical model. One or more models of alternate scenarios are then compared against the baseline scenario. The alternate scenario models are statistical models based on established carbon crediting schemes. These alternate scenarios may for example include schemes such as harvest deferral, alternate forest management, reforestation and the like.

The effect of implementing one or more alternate scenarios on the carbon sequestration performance of the property are then estimated from the models to determine potential carbon credit production. The landowner or their authorized representative then makes a commitment to implement the alternate scenario for an activity period. The state of the property is then re-confirmed at the end of the activity period, to verify that the property has actually been subjected to the alternate scenario as expected. If verification can be made, then verified carbon credits may be issued to the landowner such as via a carbon credit update process.

In an example implementation the base map may include property boundaries, tree counts, tree diameters, tree species, density, and other parameters.

In some implementations a risk of removal may be part of the alternate scenario model. The risk of removal may depend on a probability that the forested area would have been harvested during the activity period even in the absence of following the alternate scenario. The risk of removal may be based on a statistical model associated with common harvest risk practices.

BRIEF DESCRIPTION OF THE DRAWINGS

Additional novel features and advantages of the approaches discussed herein are evident from the text that follows and the accompanying drawings, where:

FIG. 5 is a list of selected components of the data elements used in the model;

FIG. 6 is a more extensive list of harvest deferral model parameters; and

FIG. 7 is a list of example verification parameters associated with a harvest deferral.

DETAILED DESCRIPTION OF EXAMPLE EMBODIMENT(S)

1. Introduction

Figure 1:
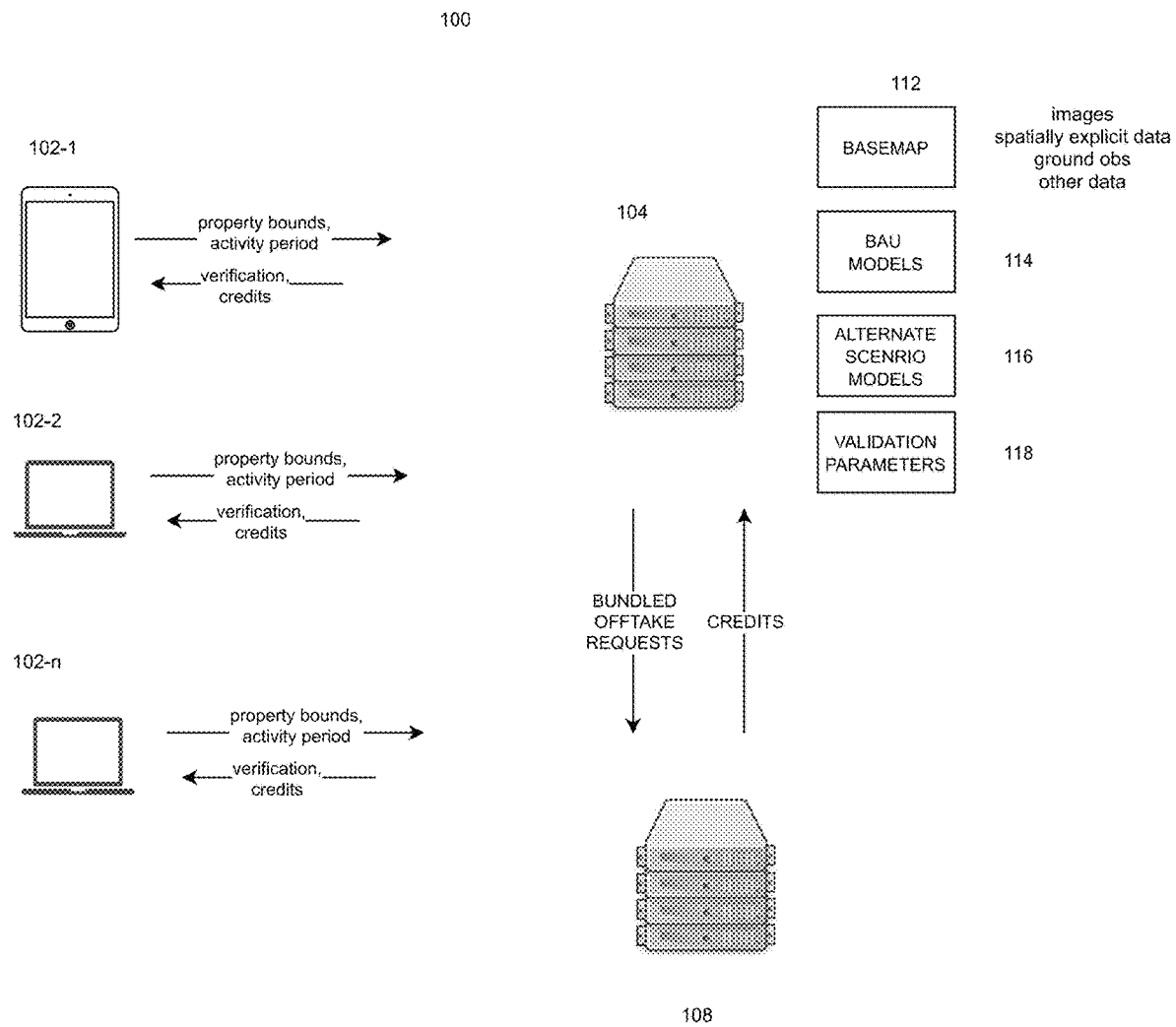
FIG. 1 is a system level diagram.

Turning to the drawings more particularly, FIG. 1 illustrates an example system 100 that implements a methodology for forest carbon credit production. In this example, a user who is authorized by the owner of a participating property landowner is accessing the system 100 via a computing platform such as a tablet, personal computer, laptop, smart phone, or similar device.

The authorized user 102 may be the landowner him or herself, an authorized agent of the landowner, a lessor, or other person or entity having a legal right with sufficient control over the property to implement alternate forest management schemes for the property.

The user 102 provides information about a potential project property such as the boundaries of one or more forested areas over which they have authorization to commit to future activities. If there is more than one area associated with a project property, it should be understood that such areas may or may not be contiguous; although such areas may typically be located within the same general geographic location.

There may be multiple users 102-1, 102-2, . . . , 102-*n* accessing the system 100 at a given time. Indeed as will be explained later in this document there are advantages to batching up carbon credit requests from multiple users 102. It should be understood that users 102 may access system 100 interactively, such as via a user interface driven web site; however data may be exchanged in numerous other ways such as via application software, email, short messaging service and any suitable data exchange method.

Another entity operating aspects of the system 100 is a project developer (also referred to herein as a broker or carbon aggregator) 104. This entity 104 is responsible for collecting information from users 102, bundling their requests for forest carbon credit. The entity 104 depends on access to other information such as a base map 112, baseline scenarios 114 (also referred to here as a Business as Usual (BAU) models, alternate scenario models 116, and validation parameters 118.

One or more base maps 112 are developed to estimate the biomass for specific participating properties. Example base maps 112 may include information about the vegetation in a forest area such as its tree counts, tree diameters, species, species density, other above ground biomass and any other attributes that affect the property's ability to remove carbon from the atmosphere. More information about development of a base map 112 on demand is provided in our co-pending US Patent Application which was incorporated by reference above.

BAU models 114 may include statistical models based on the typical behavior of a typical landowner with respect to their treatment of a participating property. These may include considerations (as explained more in more detail later) such as the propensity of a landowner to remove trees from the project property area, usual rules for management of the project property, the proximity of roads and mills, and other parameters.

Alternate scenario models 116 relate to behaviors that can be adopted in lieu of the baseline scenario 116. These may include statistical models of forest harvest deferral, or other alternate forest management methods, reforestation, and/or mode Is of other future activities that would positively affect carbon production for the participating property.

Validation parameters 118 are used to verify that the landowner has properly implemented an alternate scenario over a defined activity period. Validation parameters 118 for an example implementation will be described in greater detail below, but may include parameters such as comparing the above ground, live tree biomass at the beginning of the activity period the above ground, live tree biomass at the end of an activity period, with consideration of the quality of merchantable timber that would have been harvested during the activity and other factors. Examples of validation parameters are also explained below.

Finally, the project developer/broker 104 interacts with a carbon crediting service 108 on behalf of user participants 102. This may involve bundling off take requests from two or more user participants 102 whose activity has been verified, and receiving carbon credits in return. Such credits may then in turn be issued to the respective users 102.

Figure 2:
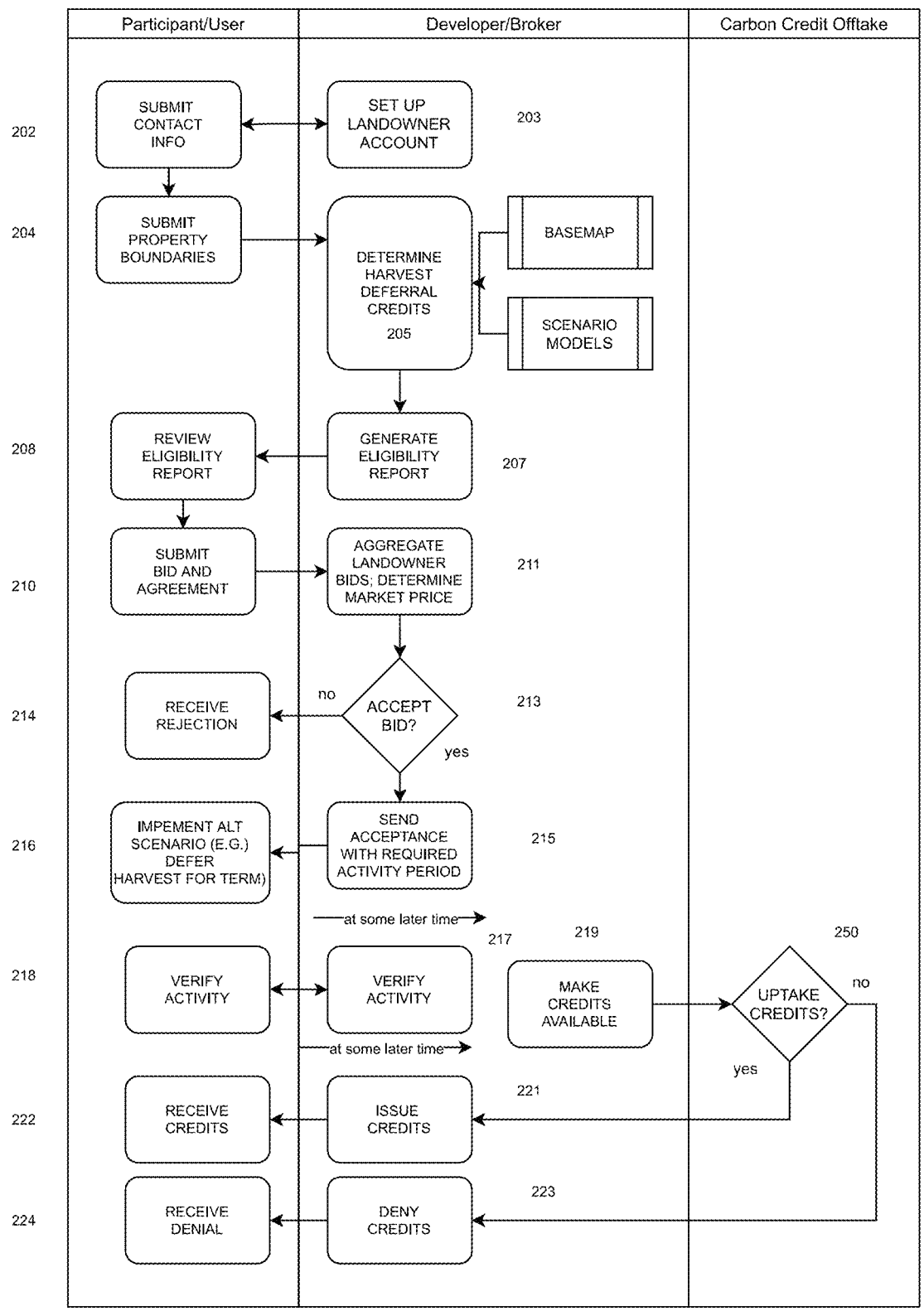
FIG. 2 illustrates an example process flow for project participant enrollment and engagement.

FIG. 2 is an example process flow. In a first state 202 the user 102 submits contact information so that the broker 104 can set up an account in state 203. Next in state 204 the user submits boundary descriptions for one or more properties for which they propose to obtain an estimate of possible carbon credits. The boundaries of the property and a proposed activity, such as harvest deferral for a specified time, are then presented by the authorized user to the broker 104.

In a subsequent step 205 the project developer/broker 104 then determines potential credits for the proposed project property. Examples of how to determine these potential credit estimates from the Base map 112, the business as usual (BAU) models 114 and alternate scenario models 116 are described below.

In state 207 the project developer/broker 104 generates a carbon credit eligibility report and shares it with user 102. After they review in state 208 the user may decide to submit a bid at state 210 with a commitment to implement the alternate scenario if the bid is accepted.

In state 211 the developer/broker 104 may decide to accept the proposed price for the activity, and typically may bundle or aggregate multiple bids to determine a market price.

In state 213 the broker 104 decides whether or not to accept a bid from the particular user. A notification of rejection is given in 214. However if the bid is accepted, this acceptance is provided in state 215 with a designation of the required commitment and activity period to adopt the alternate scenario.

In state 216 alternate scenario is implemented for the project property for the activity period. For example, the user 102 then defers forest harvest for the property for a year. At some later time such as after the end of the activity period, the broker 104 the user 102 and possibly third parties engage in an exchange of information to verify that the agreed to activity was actually completed. For example verification may involve generating another estimate of carbon from real time estimates of the ability of the forested area to remove carbon; or verification may involve ground measurements by human inspectors. if the alternate activity can be verified, then credits are made available. State 219 may involve making a request to a credit update credit service. In state 250 the a decision is made to actually generate verified credits in state 221 or deny them in state 223.

Figure 3:
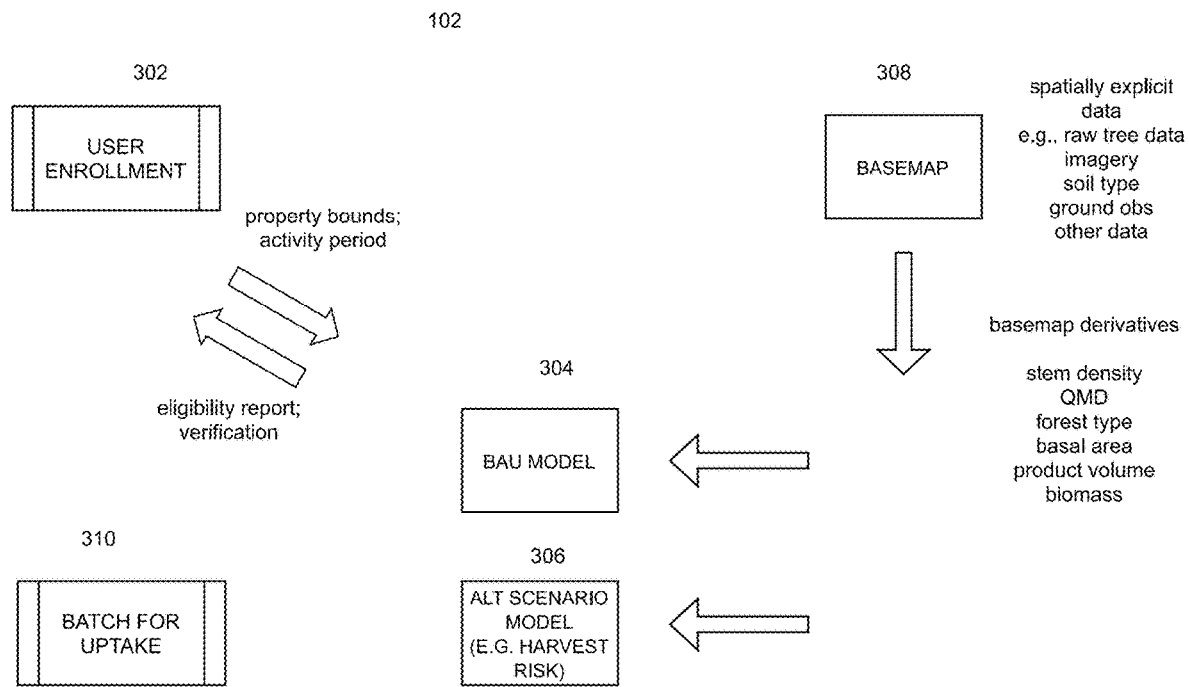
FIG. 3 is a high level data flow diagram.

FIG. 3 is a high-level data flow diagram for the methodology implemented by the developer/broker 102. Authorize user enrollment 302 includes collecting information such as information about a forested property owner, the property boundaries and a proposed activity period. This information is then analyzed against a Business as Usual (BAU) statistical behavioral model and an alternate scenario statistical model. These behavioral models may depend on data from a base map 308. The base map 208 may include information directly derivable from sources such as satellite imagery to generate spatially explicit data for each forested property of interest. It may include spatially explicit data such as raw tree data including tree counts, tree diameters, tree species, tree species density as well as other information such as soil type, ground biomass, and other observations such as those taken on the ground but available via on-demand databases. Derived information in the base map 308 may include stem density, forest type, total biomass, and product volume.

Information from the base map feed the BAU model 304 and alternate scenario models 306 to develop the eligibility report.

At the end of an activity period, verification data is returned to the developer/broker 102 and used for carbon credit uptake 310.

Figure 4:
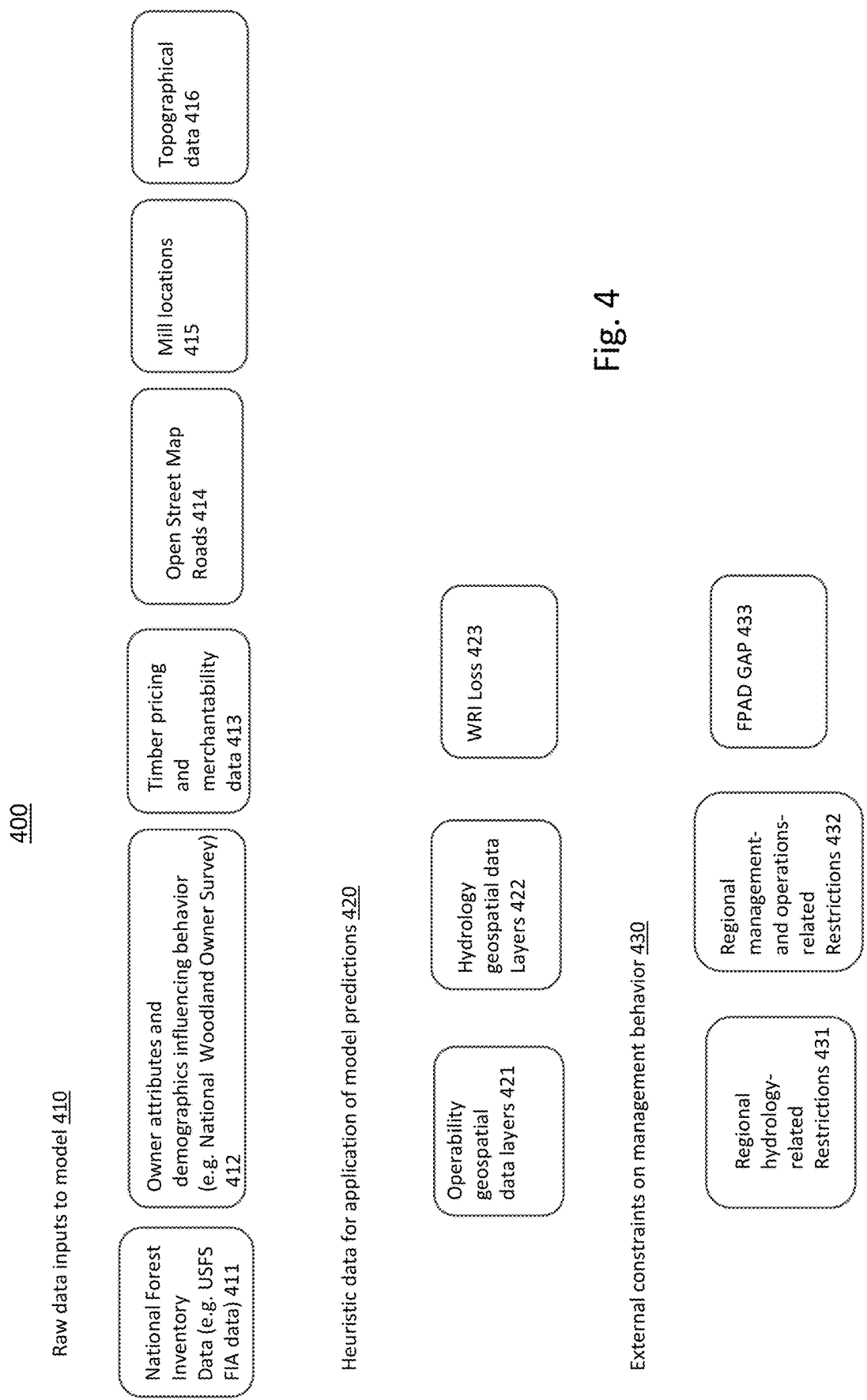
FIG. 4 illustrates an example Business as Usual (BAU) model or baseline removals model.

FIG. 4 is an example of data elements 400 that may compose a statistical BAU model 114. These include raw data inputs 410, heuristic data for application of model predictions 420, and external constraints on management behavior 430.

Raw data 410 may include national forest inventory data 411 (such from the US Forest Service FIA database), owner attributes and demographics that influence behavior (such as from the National Woodland Owner Survey) 412, timber pricing and merchantability 413, road locations 414, mill locations 415 and topographical data 416.

Heuristic data 420 may include operability geospatial data 421, hydrology geospatial data layers 422, and standardized forest disturbacne data (such as World Resources Institute Global Forest watch data) 423.

External constraints on management behavior may include regional hydrology-related restrictions 431, other regional management and operations restrictions 432, and protected areas data 433 as may be available from the Protected Area Database of the United States (PADUS) (US Geological Survey 2021).

An Example Methodology—Harvest Deferral Over a Defined Activity Period

The example methodology described in detail here is applicable to projects wherein participants elect to defer timber harvests for a specified length of time. It should be understood, however, that the methods and techniques described may also be applicable to other project scenarios such as alternative forest management schemes. Projects using this methodology may be considered under the Improved Forest Management (IFM) subclass of extended rotation age (ERA) projects. The example methodology relies on a performance method for the demonstration of additionality and selection of a crediting baseline.

Project crediting under the methodology is only allowed on an ex-post basis (i.e. after outcomes have been achieved and verified on the landscape). For example, harvest deferrals, and any associated stock changes, may be monitored through plot-based field measurements of carbon stocking that inform both the baseline scenario and the project scenario. Verification involves repeated measures, with the same plots measured at the beginning of a reporting period, time t0, and after completion of the reporting period, time t1. Spatially explicit remote sensing data of the program area and additional field measurement may also be employed to enhance repeat field-based measurements and to detect areas of disturbance during the activity period (i.e. between t0 and t1). Therefore, this is a performance-based methodology that relies on measurements to demonstrate harvest deferrals, and associated emission reductions/removals, in relation to a baseline scenario. As such, growth and yield modeling that is necessary in most IFM project types need not be employed.

The methodology may use a tonne-year accounting approach to permanence (where a tonne-year refers to one MT of $CO_2$, sequestered for one year). The conversion rate between tonne-years and permanent tonnes may be separately separately approved by organization(s) that are used to certify tradeable credits such as the Verifiable Carbon Units (VCUs) certified by Verra® (Verra is a trademark of Verra, a non-profit corporation located in Washington D.C.). The tonne-year accounting approach allows for equivalence to permanent tonnes on an annual basis and therefore permanence risk assessment and buffer pool contributions are not required.

Projects utilizing this methodology may typically employ a grouped project approach, thereby opening carbon markets to smaller-size landowners with historically low rates of participation. Small and mid-size forest landowners can participate not only due to low fixed costs but also due to flexibility in project structure. The inclusion of small and mid-size forest landowners (say, holdings of less than 5,000 acres) is not typically possible due to the requirements of many IFM methodologies, but landowners at these small size classes represent millions of landowners and hundreds of millions of acres of forestland in the United States.

The methodology is compatible with plantation forests, unlike most other IFM methodologies. The relatively consistent forest management practices and harvest behavior associated with plantation forests fits well with, for example, a harvest deferral strategy because those attributes facilitate this methodology's approach to the selection of a crediting baseline (specifically, its business as usual (BAU) estimation techniques). Further, rapid biological growth rates of many plantation species at or near their conventionally optimal rotation age (e.g. Southern yellow pine at ages 25-30) also make them well-suited for carbon sequestration purposes.

Finally, while this methodology is notably applicable to plantation forest types and a range of forest types (e.g., "41-Deciduous Forest", "42-Evergreen Forest", "43-Mixed Forest", "51-Dwarf Scrub", "52-Shrub/Scrub", and "90-Woody Wetlands" as specified in the U.S. National Land Cover Database at https://www.mrlc.gov/) and a range of ownership types.

DEFINITIONS

Activity period: The interval of time during which the project activity is undertaken on a participating property.

Crediting period: The time period for which GHG emission reductions or removals generated by the project are eligible for issuance as credits.

Instance: An instance is a participating property that shares an activity period with other participating properties, meaning they start and finish the project activity at the same time as one another.

Logging Slash: Dead wood residues (including foliage) left on the forest floor after timber removal.

Participating property: Forested area meeting selected applicability conditions as described herein; distinguishable from surrounding forestland by virtue of its ownership or management by a participant, as relevant; enrolled voluntarily by the participant in the project.

Program area: A geographic region of applicability for participating properties, as determined by the project proponent in light of project proponent's ability to satisfy this methodology's requirements in that geographic region. Defined at the project level. For example, the program area for a project under this methodology could be one or several U.S. states.

Project activity: The specific set of technologies, measures and/or outcomes, specified in a methodology applied to the project, that alter the conditions identified in the baseline scenario and which result in GHG emission reductions or removals. In this methodology, the project activity is harvest deferral.

Project participant or Participant or Authorized User: A party who has the right, without the consent of any third party (or in the case of an authorized representative of the legal owner(s), without any further permission or consent from the legal owner(s)), to (i) harvest, or defer the harvest of, the timber on all land within the participating property, subject to constraints within the municipality, county, state, and/or country in which such property is located and applicable state and federal environmental law and regulations, and (ii) sell to a third party all environmental attributes and rights to make environmental claims related to such harvest or deferred harvest. It is understood that such rights may be held by various different types of parties, including but not limited to property managers, timber rights owners, fee simple owners, and holders of any other form of land tenure that includes the rights specified herein. In the case of privately-owned forests in the U.S., the most common relevant form of tenure would typically be fee simple ownership evidenced by possession of title to the asset.

Project proponent: The individual or organization that has overall control and responsibility for the project, or an individual or organization that together with others, each of which is also a project proponent, has overall control or responsibility for the project. The entity(s) that can demonstrate project ownership in respect of the project.

Applicability Conditions

The example methodology described herein applies to project activities that reduce harvested timber relative to a baseline scenario over an activity period. The activity period may be as short as one year but may also be longer. The project activity may be referred to as "harvest deferral."

The methodology is applicable to projects wherein participants elect to defer timber harvests for a specified length of time; therefore, projects using the methodology are considered under the improved forest management (IFM) subclass of extended rotation age (ERA) projects.

This methodology is applicable under the following conditions:
1) Participating properties are subject to timber harvesting in the baseline scenario during the activity period as determined via a Business as Usual (BAU) assessment.
2) Participating properties qualify as forests and must remain forests while implementing the project activity.
3) The project participant has sufficient control over the participating property, per the definition provided in the Definitions section above.
4) The project proponent must be either a project participant or an interested party with an agreement to implement the project on behalf of the project participant(s).
5) There are no encumbrances, regulatory or otherwise, on the participating property that would impair the participant's ability to harvest.
6) The participating property falls within the program area.
7) All forested property within the program area (i) that is owned by a particular set of beneficial owners (whether an individual, family, legal entity, or otherwise) or (ii) over which a single property manager has been given legal managing authority on behalf of a particular owner or set of owners, is enrolled in the project and is considered a "participating property" per the Definitions section above.

The geographic applicability of the methodology is limited only by the availability of appropriate data sources and quantification techniques. The methodology specifies a process that is applicable in the United States (due to data availability), but the methodology may apply to projects located in countries where relevant data sources are available and where all other requirements of this methodology can be met. (Note that application of this methodology in countries other than the United States would require a revision to the methodology for inclusion of, for instance, relevant biomass estimation techniques and modifications to the baseline scenario selection procedure.)

For Grouped Projects, the below eligibility criteria apply to new instances that are added to the project following initial validation of the project. New instances must:
Meet all applicability conditions listed above;
Be located in the same program area as all other instances included in the project;
Undertake the same project activity as the initial instances and be assessed using the same quantification methods.

Project Boundary

The spatial extent of the project boundary encompasses all participating properties within a program area.

The carbon pools included or excluded from the project boundary may be as shown in the Selected Carbon Pools list below.

| Selected Carbon Pools List | | |
| --- | --- | --- |
| Source | Included? | Justification/Explanation |
| Above-ground tree biomass | Yes | Required pool subject to significant change due to the project activity. |
| Above-ground non-tree biomass | No | Not required due to insignificance. |
| Below-ground biomass | No | Conservative exclusion as pool is likely to increase due to the project activity. |
| Litter | No | Not required due to insignificance. |
| Dead wood | No | Not required as logging slash is not expected to increase as a result of the project activity. |
| Soil | No | Not required due to insignificance. |
| Wood Products | Contingent | Harvest deferral leads to a shift in the HWP decay curve, whose impact differs depending on the number of years harvest is deferred (Section 8.5). |

Baseline Scenario

For participating properties, the most plausible baseline scenario is a common practice harvest as determined through a BAU assessment. The specific amount of "carbon at risk" of harvest should be determined for each participating property taking into consideration any legal constraints on harvesting (as per the Applicability conditions). Baseline models should also contain steps that prevent property-level predicted harvest amounts from exceeding operational harvest limits.

The baseline scenario should be reconstructed for each activity period during a crediting period and therefore represents a dynamic performance benchmark. This ensures that the baseline scenario is continually evaluated to ensure validity based on the participating properties during each activity period.

To develop the common practice harvest for each participating property, project proponents the below steps may be followed to estimate the percentage likelihood that a given acre would be harvested during the activity period, and what proportion of the standing carbon would be expected to be removed in that event. In the event there is an existing exercisable option for timber purchase on the land in question, the likelihood of harvest may be appropriately set at 100%.

The aggregation of the carbon at risk across all acres of the participating properties will generate the carbon at risk of removal due to harvesting during the activity period.

The methodology does not prescribe a specific model to derive the common practice harvest and associated carbon at risk. However, any model used to form the common practice harvest and associated carbon at risk should fit within the general framework described by Prestemon & Wear (2000):

| Equation 1: Generalized framework for probability of harvest $P_H = f(V_T, V_{NT}, C_H | G)$ | |
|---|---|
| Where: | |
| $P_H$ | Probability of harvest |
| $V_T$ | Timber value of the stand |
| $V_{NT}$ | Non-timber value of the stand |
| $C_H$ | Cost of harvest |
| G | Grouping term that denotes forest stands with similar responses |

The Baseline Common practice harvest model is discussed in more detail below. Predicted harvest volumes may be based on region- and forest type-specific normal silvicultural implementations as observed in an authoritative source such as national forest inventory data. Inputs to the model must be grounded in academic research and/or empirical evidence; all models are subject to rigorous performance validation per the uncertainty procedures. For example, the Baseline Common practice harvest model below describes one such predictive model. The output of this predictive model, carbon at risk of harvest during an activity period, forms the baseline scenario for projects utilizing this model. Should a project proponent choose to develop an alternative model for use as a dynamic performance benchmark, the project proponent may develop a new module for application within this methodology. Such benchmark/module should the required steps for methodology module approval with any organization that will be expected to accept the verified activity.

Additionality

This methodology may use a dynamic performance method for the demonstration of additionality.

Step 1: Regulatory Surplus

Project proponents may wish to demonstrate regulatory surplus.

Step 2: Performance Benchmark

The procedure described herein provides a dynamic performance benchmark in the form of carbon at risk of removal due to harvesting that would occur, in the absence of carbon finance, during the activity period. This performance benchmark forms the baseline scenario for the activity period. Deferral of harvests that would occur under the project scenario, may be deemed additional.

Quantification of GHG Emission Reductions & Removals

One possible methodology quantifies the Green House Gas (GHG) impact of harvesting less timber on participating properties during the activity period than would be harvested under the baseline scenario. Reducing the amount of timber harvested increases the average age of forests relative to the baseline scenario which also increases total carbon storage relative to the baseline scenario.

Baseline Emissions

For each activity period, the baseline scenario is quantified by aggregating the BAU harvest assessment of all participating properties in the program area.

Stock change in the baseline scenario above ground live tree biomass carbon pool may be calculated as follows:

$$C_{bau} = \sum_{i=1}^{n} C_{t0,i}(1 - r_i) \quad \text{(Equation 2)}$$

$$\Delta CO2_{bsl,t} = \sum_{i=1}^{n} C_{t0,i} - C_{bau} \quad \text{(Equation 3)}$$

OR $$\Delta CO2_{bsl,t} = \sum_{i=1}^{n} (C_{t0,i} * r_i)$$

Where:

| | |
|---|---|
| $C_{bau}$ | Carbon contained in above ground live tree biomass in the baseline scenario at the end of the activity period; ($tCO_2$) |
| $C_{t0,i}$ | Carbon contained in above ground live tree biomass at the beginning of the activity period (t0), for participating property, i; ($tCO_2$) |
| $r_i$ | Fraction of total carbon contained in above ground live tree biomass removed in the baseline scenario for property i, as a percent (%) |
| n | Total number of participating properties; (unitless) |
| $\Delta CO2_{bsl,t}$ | Stock change in above ground live tree biomass in the baseline scenario in the activity period, t; ($tCO_2$) |

Carbon contained in above ground live tree biomass at the beginning of the activity period is calculated as follows:

$$C_{t0,i} = PP_{Ct0,i} * PP_{a,t,i} \quad \text{(Equation 4)}$$

Where:

| | |
|---|---|
| $C_{t0,i}$ | Carbon contained in above ground live tree biomass at the beginning of the activity period (to), for participating property, i; ($tCO_2$) |
| $PP_{C,t0,i}$ | Above ground live tree carbon at participating property, i, at the beginning (t0) of activity period, t; ($tCO_2$/acre or $tCO_2$/ha) |
| $PP_{a,t,i}$ | Area of participating property, i, during activity period, t; (acres or hectares) |

Project Emissions

Crediting in this methodology stems from the deferred harvest activity. For each activity period, the project scenario is quantified by estimating carbon contained in above ground live tree biomass at the beginning and end of a cycle.

Stock change in the project above ground live tree biomass carbon pool is calculated as follows:

$$\Delta CO2_{p,t} = \sum_{i=1}^{n} C_{t1,i} - \sum_{i=1}^{n} C_{t0,i} \quad \text{(Equation 5)}$$

Where:

| | |
|---|---|
| $\Delta CO2_{p,t}$ | Stock change in above ground live tree biomass in the project scenario in the activity period, t; ($tCO_2$) |
| $C_{t1,i}$ | Carbon contained in above ground live tree biomass at the end of the activity period (t1), for participating property, i; ($tCO_2$) |
| $C_{t0,i}$ | Carbon contained in above ground live tree biomass at the beginning of the activity period (t0), for participating property, i; ($tCO_2$) |

Carbon contained in above ground live tree biomass at the end of the activity period is calculated as follows:

$$C_{t1,i} = PP_{Ct1,i} * PP_{a,t,i} \quad \text{(Equation 6)}$$

Where:

| | |
|---|---|
| $C_{t1,i}$ | Carbon contained in above ground live tree biomass at the end of the activity period (t1), for participating property, i; ($tCO_2$) |
| $PP_{C,t1,i}$ | Above ground live tree carbon at participating property, i, at the end (t1) of activity period, t; ($tCO_2$/acre or $tCO_2$/ha) |
| $PP_{a,t,i}$ | Area of participating property, i, during activity period, t; (acres or hectares) |

The amount of deferred carbon (carbon existing above and beyond the baseline scenario) at the end of a cycle is:

$$C_d = \sum_{i=1}^{n} C_{t1,i} - C_{bau} \quad \text{(Equation 7)}$$

OR $$C_d = \Delta CO2_{bsl,t} + \Delta CO2_{p,t}$$

Where:

| | |
|---|---|
| $C_d$ | Amount of deferred carbon between t0 and t1, i.e., additional above ground live tree biomass resulting from the project; ($tCO_2$) |
| $C_{t1,i}$ | Carbon contained in above ground live tree biomass at the end of the activity period (t1), for participating property, i; ($tCO_2$) |
| $C_{bau}$ | Carbon contained in above ground live tree biomass in the baseline scenario at the end of the activity period; (tCO2) |
| $\Delta CO2_{bsl,t}$ | Stock change in above ground live tree biomass in the baseline scenario in the activity period, t; ($tCO_2$) |
| $\Delta CO2_{p,t}$ | Stock change in above ground live tree biomass in the project scenario in the activity period, t; ($tCO_2$) |

Leakage

Activity shifting leakage is assumed to be zero given the Applicability Condition described elsewhere. Market shifting leakage, $ML_t$, may be calculated as follows.

$$ML_t = CO2_{bau,t} * WLDF_t \quad \text{(Equation 8)}$$

Where:

| | |
|---|---|
| $ML_t$ | Market leakage in activity period, t; ($tCO_2$) |
| $CO2_{bau,t}$ | Aggregated business as usual harvest level of participating properties during activity period, t; as determined through the procedure described in section 6 ($tCO_2$) |
| $WLDF_t$ | Weighted leakage deduction factor during activity period, t; (%) |

A harvest deferral project using this methodology may apply a leakage deduction factor, $LDF_t$, of 10% in equation 9 for participating properties for the first seven years of participation in a project as it is not expected that there will be a permanent overall reduction in timber supply.

This methodology makes the conservative assumption that after 7 years of participation in a project, there is a permanent reduction in timber supply from a participating property. Therefore, beginning in year 8 of participation, the leakage deduction factor associated with a participating property must be determined. Per VCS requirements, this analysis considers stocks that are the same or similar to the species in the participating property. Determining the leakage deduction factor, $LDF_t$, to be applied in equation 9 is done as follows:

1) Calculate the ratio of merchantable biomass to total biomass in the area to which harvesting is displaced
2) Calculate the ratio of merchantable biomass to total biomass in the participating property
3) Apply the appropriate leakage deduction factors as follows:
   a) Where the ratio of merchantable to total biomass in the displaced area is higher (greater than 120%) than the participating property level, $LDF_t = 20\%$
   b) Where the ratio of merchantable to total biomass in the displaced area is similar (within +/−20%) to the participating property level, $LDF_t = 40\%$
   c) Where the ratio of merchantable to total biomass in the displaced area is lower (less than 80%) than the participating property level, $LDF_t = 70\%$ Once the appropriate leakage deduction factor, $LDF_t$, has been determined based on the length of time a participating property has been included in a project, a weighted leakage discount factor is calculated.

The weighted leakage deduction factor, $WLDF_t$, may be calculated as follows:

$$WLDF_t = \frac{\sum_{i=1}^{n}(LDF_t * PP_t)}{\sum_{i=1}^{n} PP_t} \quad \text{(Equation 9)}$$

Where:

| | |
|---|---|
| $WLDF_t$ | Weighted leakage deduction factor during activity period, t; (%) |

| | |
|---|---|
| LDF$_t$ | Leakage deduction factor during activity period, t; apply 10% for all participating properties included in the project for up to 7 years; apply appropriate factor, per the above procedure, for all participating properties included in the project for years 8 and beyond; (%) |
| PP$_t$ | Participating property during activity period, t; unitless |

Uncertainty

Uncertainty may be defined at the 90% confidence interval where the estimated variance exceeds+/−10 percent from the mean. Procedures including stratification and the allocation of sufficient measurement plots will help ensure that low uncertainty results and ultimately full crediting can result.

It is good practice to consider uncertainty at an early stage to identify the data sources with the highest uncertainty to allow the opportunity to conduct further work to diminish uncertainty.

For both the baseline and the with-project case the total uncertainty is equal to the square root of the sum of the squares of each component uncertainty and is calculated at the time of reporting through propagating the error in the baseline stocks and the error in the project stocks.

The uncertainty deduction may be derived according to the following instructions. For the baseline and project above ground live tree biomass estimations, uncertainty is assessed based on the sampling error. It is assumed that no uncertainty is associated with other variables, such as overall project area, as accurate GIS boundaries are required to conduct the project.

For the above ground live tree biomass carbon pool in the baseline and project scenarios, calculation of the mean and 90% confidence interval is required. Uncertainty is then documented as the 90% confidence interval as a percentage of the mean.

For baseline above ground live tree biomass, uncertainty may be calculated as follows:

$$UNC_{bsl,t} = \sqrt{ALT_{bsl,t} * UNC_{altbsl,t}}$$ (Equation 10)

Where:

| | |
|---|---|
| UNC$_{bsl,t}$ | Uncertainty in above ground live tree biomass in the baseline scenario in activity period, t; (percent) |
| ALT$_{bsl,t}$ | Above ground live tree biomass aggregated across all participating properties in the program area at the beginning of activity period, t; (tCO$_2$) |
| UNC$_{alt,bsl,t}$ | Uncertainty in above ground live tree biomass at the beginning of activity period, t; 90% confidence interval of mean carbon stock (percent) |

For the project scenario above ground live tree biomass, uncertainty may be calculated as follows:

$$UNC_{p,t} = \sqrt{ALT_{p,t} * UNC_{p,t}}$$ (Equation 11)

Where:

| | |
|---|---|
| UNC$_{p,t}$ | Uncertainty in above ground live tree biomass in the project scenario in activity period, t; (percent) |
| ALT$_{p,t}$ | Above ground live tree biomass aggregated across all participating properties in the program area at the end of activity period, t; (tCO$_2$) |
| UNC$_{p,t}$ | Uncertainty in above ground live tree biomass at the end of activity period, t; 90% confidence interval of mean carbon stock (percent) |

Total uncertainty during the activity period may be calculated as follows:

$$UNCap,t = \sqrt{UNC_{bsl,t}^2 + UNC_{p,t}^2}$$ (Equation 12)

Where:

| | |
|---|---|
| UNC$_{ap,t}$ | Total uncertainty in activity period, t; (percent) |
| UNC$_{bsl,t}$ | Uncertainty in above ground live tree biomass in the baseline scenario in activity period, t; (percent) |
| UNC$_{p,t}$ | Uncertainty in above ground live tree biomass in the project scenario in activity period, t; (percent) |

An uncertainty deduction applied to the activity period, UNCt, may be computed as follows:

If UNC$_{ao,t}$ is 10% then UNC$_t$=1.5%.
If UNC$_{ap,t}$ is >10% then UNC$_t$ is calculated as follows:

$$UNCt = UNCap,t - 10\% + 1.5\%$$ (Equation 13)

Where:

| | |
|---|---|
| UNC$_t$ | Uncertainty deduction in activity period, t; (percent) |
| UNC$_{bsl,t}$ | Total uncertainty in activity period, t; (percent) |

To be conservative, the minimum uncertainty factor may be set to 1.5% to account for possible uncertainty within other unmeasured assumptions used in calculations and modeling.

Harvested Wood Products

The project activity is a deferral of a planned harvest for a specified period of time. As the BAU scenario would involve harvest activity, a fraction of the harvested wood under that BAU scenario would likely go into long-term storage, suggesting that the methodology could account for that long-term HWP storage in order to avoid over-crediting when the difference is taken between the BAU and the project scenarios.

The impacts of HWP storage related to harvest deferral activity are de minimus, however, for the following reasons:

1. The harvest deferral alone is the creditable activity, per the tonne-year accounting approach. Thus the amount of wood harvested is equivalent under the BAU and the project scenarios: the harvest simply occurs one year later. While the harvest deferral will slightly delay the onset of long-term carbon storage in the resulting HWP, the negative impact of this storage delay is outweighed by the positive impact of the harvest deferral itself, the majority of whose emissions would have undergone instant oxidation.

If the wood product were stored long-term, due to a one-year harvest deferral, a product that would have been disposed of at year 50 will be disposed of at year 51 instead. Thus the harvest deferral is accompanied by a one-year shift outward in the HWP decay curve. This shift has minimal effect and can be valued using discounting, following the tonne-year accounting approach.

2. When harvest deferral occurs, larger trees will eventually be harvested. Larger trees lend themselves more readily to long-term storage in HWP, suggesting that on a volume basis storage in the wood products pool will increase. In other words, because of the shift toward larger trees the overall impact of the project activity on long-term HWP storage will ultimately be positive.

3. When considering only long-term carbon storage in wood products (i.e. not inclusive of substitution effects), decay of wood products, and harvest and process-related emissions, as well as the changing nature of end uses through time, the GHG impact from carbon sequestration and end of life scenarios with carbon storage is uncertain and currently cannot be accurately measured.

4. The rationale for including long-term storage in the HWP pool is often to incentivize building with wood instead of with steel. However, the embodied emissions associated with wood products can be substantial, rivaling those of concrete and steel (e.g. Hudiburg et al. 2019).

Net GHG Emission Reductions

Net GHG emission reductions may be calculated as follows:

$$ER_t = C_d * (1-UNCt) * (1-MLt) * TYC * HWP \quad \text{(Equ 14)}$$

Where:

| | |
|---|---|
| $ER_t$ | Emission reductions / removals during the activity period, t; ($tCO_2$) |
| $C_d$ | Amount of deferred carbon between t0 and t1, i.e., additional above ground live tree biomass resulting from the project; ($tCO_2$) |
| $ML_t$ | Market leakage in activity period, t; ($tCO_2$) |
| $UNC_t$ | Total uncertainty deduction factor for activity period; t(%) |
| TYC | Ton year accounting conversion; (%) |
| HWP | Deduction for effect of storage in HWP; (%) |

Monitoring

Data and Parameters Available at Validation

As explained elsewhere, a validation step may be part of generating carbon credits that will be accepted by a verifying organization. The following tables include example data and parameters (as listed in FIG. 7) that may be used for such validation.

| | |
|---|---|
| Data/Parameter | $PP_{a,t,i}$ |
| Data unit | Acres or hectares |
| Description | Area of participating property, i, during activity period, t; |
| Equations | (Equation 4)(Equation 6) |
| Source of data | GIS data |
| Justification of choice of data or description of measurement methods and procedures applied | GIS coverages and remote sensing data used to determine the extent of the program area must be georeferenced. |
| Purpose of Data | Calculation of carbon stocks in baseline and project scenarios |
| Data/Parameter | TYC |
| Data unit | Percent |
| Description | Ton year accounting conversion |
| Equations | (Equation 14) |
| Source of data | Parisa et al. 2021 "The Time Value of Carbon," https://www.researchsquare.com/article/rs-966946/v1 |
| Value applied | Varies |
| Justification of choice of data or description of measurement methods and procedures applied | This value corresponds to the number of ton-years required to be climatically equivalent to one permanent ton, and will vary depending on the number of years deferral is planned. For a one year deferral, for example, 30.8 ton-years are equivalent to one permanent ton, so this value for a one-year deferral is 1/30.8, or 0.0325. |
| Purpose of Data | Calculation of net GHG emission reductions |

Data and Parameters Monitored

| | |
|---|---|
| Data/Parameter | $r_i$ |
| Data unit | % |
| Description | Fraction of total carbon contained in above ground live tree biomass removed in the baseline scenario for property i |
| Equations | (Equation 3) (Baseline Common practice harvest model) |
| Purpose of Data | Calculation of baseline scenario |
| Data/Parameter: | $PP_{C,t0,i}$ and $PP_{C,t1,i}$ |
| Data unit: | $tCO_2$/acre or $tCO_2$/ha |
| Description: | Above ground live tree biomass at participating property, i, at the beginning (t0) of activity period, t And Above ground live tree biomass at participating property, i, at the end (t1) of activity period, t |
| Equations | (Equation 4)(Equation 6) |
| Source of data: | Field-based measurements and a spatially explicit estimate of standing carbon stocks |
| Description of measurement methods and procedures to be applied: | Above ground live tree biomass may be quantified using a combination of remote sensing imagery and models combined with plot-based field samples. In either case, I biomass must be modelled from these measurements, in order to propagate uncertainty from these values within estimation of project and baseline emissions as explained elsewhere. The specific sampling procedures for above ground live tree biomass need not be prescribed in the methodology. However, plot-based field samples must be unbiased, representative of the program area, and adhere to quality control procedures specified by the project proponent. Stratification may be employed but is not required. Biomass and carbon stocks may be determined through design-unbiased field sampling coupled with remote sensing data to develop forest inventories at t0 (beginning of activity period) and t1 (end of activity period) to ensure precise and unbiased estimates of carbon stocks within the project instance. |

In the continental United States, above ground live tree biomass may be derived using the component ratio method (CRM) outlined in Woodall et al. Under this approach, the basic steps to obtaining above ground live tree biomass and carbon for a single tree are:

1. Predict bole volume ($m^3$) using tree-level (species, dbh, total height, etc.) and potentially stand-level (basal area, etc.) variables.
2. Predict green wood density (GWD) using tree-level (species, functional group) and potentially environmental (climate, etc.) variables.
3. Estimate bole biomass (kg) as bole volume * GWD.
4. Estimate biomass of remaining components (stump, bark, crown) through component sub-models.
5. Calculate total live tree aboveground biomass as the sum of all components.
6. Carbon is quantified from biomass through application of a standard carbon fraction of .5 and the ratio of the molecular weight of carbon dioxide/carbon of 44/12 (or one ton of carbon =~3.67 tons of carbon dioxide).

1. Bole volume

The CRM uses a set of standard volume equations maintained by the FIA program to estimate gross cubic-foot volume, and a second set of equations to convert these to sound volume (volume accounting for potential loss due to damage or disease). These equations can be found in Appendix A of Woodall et al. 2011.

2. Bole biomass

In the CRM, conversion from cubic-foot sound bole volume to bole biomass (lbs) is done with species-specific values of wood specific gravity (WSG) compiled by Miles and Smith (2009).

Bole biomass is calculated as:

bole wood biomass = bole volume × WSG × W
WSG: oven dry mass of green wood volume
W: 62.4 lbs; a constant representing the weight of one cubic foot of water
bole bark biomass = bole volume × BV % × BSG × W
BV %: bark as a percent of volume (a species-specific constant from FIA)

-continued

| | |
|---|---|
| | BSG: oven dry mass of green bark
total bole biomass = bole wood biomass + bole bark biomass
3. Component biomass
Within the CRM, the remainder of a tree's aboveground biomass is estimated as two additional components: stump and top.
Stump biomass is estimated using equations from Raile (1982). The procedure is similar to the estimation of bole biomass:
   1. Estimate stump volume with Raile's equation (eqn. 5 in Woodall et al. 2011).
   2. Calculate stump wood biomass using the same procedure applied to the bole.
   3. Calculate stump bark biomass as a proportion of wood biomass.
   4. Calculate total stump biomass as the sum of stump wood and bark biomass.
Top biomass is estimated with an indirect procedure:
   1. Estimate total aboveground biomass (TAB) with equations from Jenkins et al. (2004).
   2. Estimate stem (MST) and foliage biomass (FOL) via Jenkins et al. (2004).
   3. Estimate stump biomass using Raile (STP).
   4. Estimate top biomass as TOP = TAB − MST − FOL − STP
Before computing CRM total aboveground biomass, stump and top biomass are corrected using the following adjustment factor:
adj = bole biomass estimated from CRM/bole biomass estimated with Jenkins et al. approach
The Jenkins et al. (2004) paper consists of allometric equations for direct estimation of total biomass and components based on dbh and species group. FIA uses some of these equations within the CRM as described above.
   1. Total aboveground biomass
Once the biomass of all components has been estimated, total aboveground biomass is calculated as:
total aboveground biomass = bole biomass + stump biomass + top biomass
   2. Biomass of saplings
For trees <5" dbh, total aboveground biomass is predicted directly using allometric models described by Jenkins et al. (2004), then applying a sapling adjustment factor (Heath et al. 2009) to align these predictions with the CRM. |
| Frequency of monitoring/ recording: | For each activity period:
Field-based sampling measurements for parameter, $PP_{C,t0,i}$ must be taken no more than 2 months prior to or no more than 2 months after the start of the activity period.
Field-based sampling measurements for parameter, $PP_{C,t1,i}$ must be taken no more than 2 months prior to or no more than 2 months after the end of the activity period.
In cases where field conditions or force majeure events delay access to measurement locations within the stated time period(s), delayed measurements are permitted if and only if transparent and reasonable methods are employed to adjust the measurements to account for the delay. |
| Purpose of data: | Used to quantify baseline and project emissions |
| Data/Parameter | MBR |
| Data unit | % |
| Description | Merchantable biomass ratio - Mean merchantable biomass as a proportion of total aboveground tree biomass for each forest type |
| Equations | None |
| Source of data | The source of data must be chosen with priority from higher to lower preference as follows:
   1. Peer-reviewed published sources (including carbon/biomass maps or growing stock volume maps with a scale of at least 1 km)
   2. Official Government data and statistics
   3. Original field measurements
The forest types considered must be only those relevant for the specific market effects leakage ie. only forest types with active timber production.
An appropriate source of data will be Government records on annual allowable cuts for the areas of commercial forests.
Where volumes are used the source of data wood density is required to convert to merchantable biomass. The source of data on wood densities must be chosen with priority from higher to lower preference as follows:
   1. Knowledge on commercial species and thus an appropriately weighted wood density derived from the density of these species
   2. A region-specific mean wood density as given eg, in Winjum Brown 1997 |
| Description of measurement methods to be applied: | Default values can be derived using FIA data based on the Forest Type Group |
| Purpose of Data | Determination of leakage deduction factor |

Description of the Monitoring Plan

Monitoring of the baseline and project scenarios may be required in many embodiments. Stock changes over an activity period are monitored through field-based measurements that may be supplemented with remote sensing measurements and data to detect, for instance, disturbance on participating properties included in the program area. Plot-based field measurements may be structured as repeated measures by taking measurements at t0 and taking measurements of the same plots again at t1. Therefore, in order to facilitate an accurate BAU assessment and to quantify emission reductions over an activity period, a new forest inventory should be constructed for each activity period during a crediting period. Monitoring and crediting may take place after the end of the activity period but before the end of the project crediting period, with explicit permission from the participant; this can include an appropriately rigorous combination of remote sensing and field measurement.

Project proponents may develop a monitoring plan documenting the data collection procedures for the monitored parameters mentioned previously. The monitoring plan may include:

The geographic coordinates of all participating properties within the program area;

If applicable, a description of the use of georeferenced spatial data in the context of the required BAU assessment and baseline (t0) and project (t1) forest inventories;

Standard operating procedures and quality control/quality assurance procedures for forest inventory field data collection and management;

Procedures must include a discussion of sample design for the activity period, including the use of stratification, the sample population, and justification of sampling intensity (noting the target precision of +/−10% of the mean at the 90% confidence interval for biomass estimates);

Procedures for the long-term storage and archival of all project-related data and information which must be archived for a minimum of two years after the end of the project crediting period; and Roles and responsibilities for all personnel involved in project monitoring.

Baseline Common Practice Harvest Model

This section describes in detail a common practice harvest model developed as described in Equation 1 above.

To develop the common practice harvest model for each participating property, project developers should estimate the probability that a given area would be harvested during the activity period, and, if harvested, what proportion of the standing carbon, r, would be expected to be removed. The aggregation of the carbon-at-risk across all acres of the participating properties is then used to generate a baseline carbon-at-risk of removal via harvesting during the activity period. Any model used to form the common practice harvest and removal model should fit within a general model form for predicting the probability of harvest for a forest stand as a function of timber value, non-timber value, and cost of harvest that can vary between landowner types. One example was described by Prestemon and Wear (2000).

$$P_H = f(V_T, V_{NT}, C_H | G) \quad \text{(Equation 15)}$$

Where $P_H$ is the probability or proportion of harvest, $V_T$ is the timber value of the stand, $V_{NT}$ is the non-timber value of the stand, $C_H$ is the cost of harvest, and G is a grouping term that denotes forest stands with similar responses.

Model Form

One model used herein can define a parameter, r, as harvest intensity expressed as a proportion and then model it using a zero-one-inflated Beta distribution:
$r \in [0, 1]$, where
$r = 0$ is no harvest
$r = 1$ is total harvest
$r \in (0, 1)$ is partial harvest $$Beta_{zoinf}(r; \alpha, \gamma, \mu, \phi) = \begin{cases} 1 - \alpha, & \text{if } r = 0 \\ \alpha\gamma, & \text{if } r = 1 \\ \alpha(1 - \gamma)f(r; \mu, \phi), & \text{if } r \in (0, 1) \end{cases} \quad \text{(Equation 16)}$$

In this model $\alpha$ is the probability of any harvest occurring, and $\gamma$ is the probability of total harvest, conditional on any harvest occurring. In the event of partial harvest, the removal rate is modeled with a Beta distribution with mean $\mu$ and precision $\phi$.

Final Harvest Risk Model Form

The model can also accommodate dependence of harvest intensity on predictors to explain heterogeneity in harvest across the landscape. For example, the model can use logit link functions to constrain values of $\alpha$, $\gamma$, and $\mu$ to the interval (0, 1), and a log link function to ensure that $\phi > 0$.

$$\alpha = \text{logit}^{-1}(X\beta_\alpha),$$

$$\gamma = \text{logit}^{-1}(X\beta_\gamma),$$

$$\mu = \text{logit}^{-1}(X\beta_\mu),$$

$$\phi = \exp(X\beta_\phi), \quad \text{(Equation 17)}$$

Where X is a design matrix containing predictive variables and $\beta\alpha$ is a coefficient vector for $\alpha$(and so on), and link functions are applied as needed to satisfy parameter bounds.

Grouping variables such as landowner type L can enter the model as Bayesian hierarchical effects on the regression coefficients:

$$\beta_\alpha \sim \text{Normal}(\eta_\alpha L, \Sigma_\alpha)$$

$$\beta_\gamma \sim \text{Normal}(\eta_\gamma L, \Sigma_\gamma)$$

. . . .

which has the impact of an interaction term between landowner effects and other effects.

Under this model, the expected harvest intensity E(r) is:

$$E(r) = \alpha(\gamma + (1-\gamma) \times f(\mu, \phi)) \quad \text{(Equation 18)}$$

The functional form of these models are given below, using R's formula syntax.

Harvest occurrence may be modeled as $$\alpha \sim A_X \times (V_{T0} + V_{T1} + C_{ABG} + D_M + S + D_R + \text{NWOS} + (V_{T0} + V_{T1} + C_{ABG} + D_M + S + D_R + \text{NWOS} | O)) \quad \text{(Equation 19)}$$

Total harvest decision may be modeled as $$\gamma \sim C_{ABG} + (C_{ABG} | O:F_C) \quad \text{(Equation 20)}$$

Partial harvest intensity may be modeled as $$f(\mu, \phi) \sim V_{T0} + V_{T1} + C_{ABG} + (V_{T0} + V_{T1} + C_{ABG} | O:F) \quad \text{(Equation 21)}$$

The table in FIG. 5 is a list of selected Harvest Risk Model Inputs; the table in FIG. 6 is a more comprehensive list Model Inputs a) Harvest Training Data The common practice harvest model may be trained using data available from the Forest Industry and Analysis (FIA) program of the U.S. Forest Service, compiled as discussed below.

The common practice harvest model may be thought of as a unified model of (1) probability of harvest; and (2) harvest intensity. Harvested plot conditions may be defined as plot conditions where at least one tree has been designated as 'harvested' on remeasurement by an FIA sampling crew (change of STATUSCD 1 to 3; Thompson et al. 2017). Harvest intensity may be estimated as annualized change in stand value (as calculated above) and total carbon (metric tons) as estimated using the component ratio method (Woodall et al. 2011).

FIA data may be processed into both plot-condition level estimates of harvest occurrence and intensity, as well as population level baselines using the rFIA package (Stanke et al. 2020).

b) Grouping Variables i. Landowner Type

Non-private landowner type may be retrieved from the OWNCD variable in the FIADB Condition Table. To ensure the confidential nature of FIA plot locations and private ownerships, the specific type of private owner (FFO, TIMO, REIT, NGO, etc.) is not reported in the FIADB.

Private landowner types may be retrieved from a raster of modeled ownership class generated by FIA researchers (Sass et al. 2020). For all FIA plots on private lands the most common private landowner type within a 1 km radius of the published plot coordinates was used to retrieve a private landowner type from the Sass dataset. For plots where the Sass dataset did not have a 1 km private-landowner type prediction, the most common private landowner type within a 10 km radius of the published, public plot coordinates may be used instead.

ii. Legally Excluded Areas

Project acreage that is legally restricted from harvest is given a harvest probability of 0. Legal restrictions are determined through affirmation by landowners and through exclusion of any areas that fall within protected areas defined as GAP Status 1 or 2 in the Protected Area Database of the United States (PADUS) (US Geological Survey 2021).

iii. National Woodland Owner Survey

The model can use the state level proportion of acres harvested, summarized from National Woodland Owner Survey data, to capture spatial heterogeneity in harvest rates.

c) Covariate Data Sources i. Total Volume

Total stand carbon (expressed as aboveground carbon in tons) may be calculated on a per acre basis as the sum of tree-level aboveground biomass, multiplied by a correction factor of 0.5 (Woodall et al. 2011; see also Forest Inventory and Analysis (FIA) Database: Database Description and User Guide for Phase 2 (version 8.0), revision: 10.2018):

CARBON_AG=0.5*(DRYBIO_BOLE+DRYBIO_S-
TUMP+DRYBIO_TOP+DRYBIO_SAPLING+
DRYBIO_WDLD_SPP),all variables in the
TREE table ii. Merchantable Volume Timber value may be computed using recent pricing information, and merchantable volume by product. For each FIA inventoried tree, merchantable volume is taken from the columns VOLCFNET, VOLCSNET, and VOLBFNET in the TREE table. These values respectively represent total merchantable volume ($m^3$) to a 4" stopper, saw timber volume ($m^3$) with a variable stopper height based on hardwood/softwood, and saw timber volume (bdft) with the same stopper heights as sawtimber volume in $m^3$. All of these volume estimates incorporate deductions for rot, missingness, and form. Sawtimber volume may be taken directly from these variables, and pulp volume ($m^3$) can be calculated as VOLCFNET−VOLCSNET. Pulp volume may be converted to green tons using species-level conversion factors found in the FIADB reference species table (REF_SPECIES). Tree-level merchantable volumes may be joined with prices on both species and product.

iii. Product Pricing Product prices may be taken from a combination of publicly published data and private aggregators (Table TIMBER-PRICES). These timber prices are reported at the county or aggregated-county level by species and species group. Species can be grouped by density class (hardwood, softwood) and mean prices calculated at the L3 ecoregion level (e.g., as per https://www.epa.go/eco-research/level-iii-and-iv-ecoregions-continental-united-states) and then used to fill missing county-level data. If an L3 ecoregion does not have any available pricing information, prices may be estimated from geographical neighbor L3 ecoregions. Within a product and class combination (e.g. hardwood sawtimber) the distribution of prices may be examined and if necessary, some species then placed in a 'high value' subgroup, with a separate mean price.

In one embodiment, the model may adjust stumpage prices using data on exported timber prices published by the United Nations Economic Commission for Europe Food and Agriculture Organization (FAO, 2021). The FAO dataset reports export prices by country and product class (e.g., hardwood sawtimber) and are reported in nominal values annually. The model can use W the US Bureau of Labor Statistic's Producer's Price Index (PPI) for 'Logs, bolts, timber, pulpwood, and wood chips' (US Bureau of Labor Statistics, 2021) to adjust all FAO export values to present day prices. Using the present-day FAO export prices, an index time series can be created expressing exported timber price relative to 2020 exported timber prices. Stumpage prices from 2020 (Table 5) were adjusted to the FIA-recorded year of harvest using the derived FAO index. Both $T_0$ and $T_1$ timber values were adjusted using the $T_0$ index value.

Plot-condition-level value estimates can be calculated by summing the per-acre tree-level values and treated as individual 'stands'. The median of all FIA 'stand' values within an L3 ecoregion can be calculated from FIA plot summaries. This median can be used as the divisor to consistently rescale all values in an L3 ecoregion. Local scaling of timber prices allows for more direct comparison of forest valuation across broad geographic and ecological ranges without the need for an explicit forest-type or geographic location term. Locally-scaled timber prices may be further adjusted using the information under A1.3.3.6.

iv. Slope

The topographic slope present on harvested and unharvested conditions may be taken directly from the FIADB for the harvest training data.

v. Distance to Road

A 60 m resolution raster of the Euclidean distance to road from OpenStreetMap data may be developed using the following road types: "motorway", "trunk", "primary", "secondary", "tertiary", "unclassified", "residential", "service", "track", "living_street" (OpenStreetMap contributors 2021). FIA published points may then be intersected with this raster layer using a 1 km focal mean to produce continuous distance-to-road estimates.

vi. Proximity to Mill

Using sawtimber and fiber-fed pulp mill locations (Forisk Consulting), it is possible to calculate a merchantability index (MI) for each product class following the methods of Pokharel and Latta (2020). A categorized rather than continuous surface may be used for each set of haul distances (Raju Pokharel, personal communication, 2020). This approach determines a maximum profitable haul time for different products. Haul times may be determined to be a function of delivered wood price, transport cost, trucking capacity, travel speed, and load/unload times. Using set long and short haul time thresholds for pulp and saw timber and the OpenStreetMaps road network, haul ranges may be mapped for each product from each mill location.

In one example, each haul range may be given a fixed merchantability index and then all haul ranges stacked and summed into a single raster representing cumulative merchantable index (CMI) over a 250 m resolution raster, and a 1 km resolution focal mean was applied before joining with FIA plots. To account for regional differences, all CMI estimates can be scaled by the 99th percentile CMI within L2 ecoregions. These scaled values may be multiplied with the locally-scaled stumpage prices. A CMI of zero indicates that there is no commercial timber market available.

d) Ancillary Values i. Growth rates

Growth rates may be calculated by forest type on a percent basis for total value and volume using model-based population-level estimates derived from FIA data with appropriate strata-weighing. Species-level growth rates were estimated for forest type groups (TYPGRPCD; for example see Appendix D of the FIA Phase 2 user guide) using the model-based estimators as described in Stanke et al. (2021).

These growth rates may be used in the BAU estimation process in two ways: (1) to project T1 volume for harvested trees; and (2) to project T0 measurements for the purpose of estimating T1 value assuming no harvest.

ii. Removal Rates

Removal rates may be calculated from the FIA observational dataset for harvested conditions. For this implementation, harvests may be encoded based on whether at least one tree has been designated as 'harvested' on remeasurement by the FIA sampling crew (change of STATUSCD 1 to 3; Thompson et al. 2017). Percent of carbon removed may be calculated as observed standing carbon at $T_1$ minus the product of standing carbon at $T_0$ and the appropriate growth rate from above.

Baseline Model Fitting Dataset Compilation
Baseline Model Training and Validation Dataset A model-based approach to setting a dynamic baseline may require a standardized dataset for model training and validation to ensure equitable performance across projects and project proponents. National forest inventories (e.g. the USFS Forest Inventory and Analysis program) provide a standardized, authoritative sources of data that cover the large geographic extents, making them well-suited to serve as baseline data for training and validation. This data selection and transformation protocol may serve to create a single standardized dataset from a national forest inventory and external covariate data. The following sections describe (a) how to select NFI plots and delineate stands and (b) procedures for adding additional information beyond the data recorded by the NFI.

National Forest Inventory Data a) Plot Selection

It is not necessary to include all available NFI plots, though a large enough sample of NFI plots must be selected to comprise a dataset capable of producing statistically robust estimation of baseline carbon at risk. Through a full propagation of baseline model imprecision (SECTION 8.4), project proponents are incentivized to select a large sample of NFI plots that are geographically and ecologically similar to the project area. For NFIs with periodic remeasurement on plot locations only remeasured plot pairs should be used. If between remeasurement periods plot conditions relevant to the project have changed those plots must be excluded. Relevant conditions include all covariates and grouping factors chosen for the project baseline model (SECTION 6). Plots may be selected only if the data were collected under the most recent protocol under which paired plots are available within an NFI. Only plots representing forested land should be selected.

b) Encoding Harvested Conditions

Harvested conditions are defined as the removal of at least one tree for commercial or non-commercial use or for land clearing (Thompson et al, 2017). Encoded harvest conditions should have an associated harvest date. This date can come from NFI data if recorded at time of inventory, or from other harvest records when available.

c) Delineating Contiguous Forest Conditions

Contiguous forest conditions, analogous to on-the-ground forest stands, are delineated within an NFI plot using the covariates and grouping factors chosen for the project baseline model (Section 6). When sub-plot-level information about these factors is available, multiple forest stands may be defined on each NFI plot and used as separate observations in the baseline scenario model(s). Stand conditions for areas encoded as harvested (C.2.2) are delineated using pre-harvest conditions (i.e., a harvested state should not be the only factor used to define a separate stand). If sub-plot-level information is not available, the entire plot should be considered a single stand. Summary of conditions for any baseline model input (e.g., stand volume, stand value, forest type, etc.) should occur at the level of these delineated forest stands.

Covariate Data d) Linking Spatial Data to NFI Data

NFI plot locations are often kept confidential, making direct spatial joins with covariate data not possible. Rasterized spatial data should have a local neighborhood smoothing that matches that of published imprecise coordinates (e.g. for USFS FIA a resolution or smooth of 1 km would capture 95% of true plot locations (Gray et al, 2012)). Covariate data reported as points should be rasterized as above. Covariate data reported as polygons should be at a scale that ensures exact matching between NFI plot location and polygons (e.g. for USFS FIA data plot locations are accurate at the county polygon level). Examples of external covariate datasets are discussed elsewhere in this document.

e) Temporal and Spatial Data Filling

Covariate datasets may not be concurrent with NFI data collection or may be spatially incomplete. Data can be filled using the temporally or geographically closest available data. More advanced data-filling is also permitted and could include distance-weighted approaches (temporal/geographic), published index adjustment (temporal, e.g. adjust timber prices based on producer's price input), or model-based using additional covariates (temporal/geographic).

f) Localization of Values

Some potential covariates can be expected to vary substantially across geographic or ecological ranges (e.g., stand volume and value per acre). Within projects that span large geographic or ecological ranges such values can be normalized to allow for a single baseline model. Normalization regions must be geographically or ecologically meaningful, approximating bounds where similar values can be expected for a given covariate.

g) Probable Harvest Thresholds

Under certain conditions commercial timber harvest is practically or legally prohibited (e.g., extremely low timber value or volume, legally restrictive conservation easements). As a conservative measure to retain additionality stands meeting these criteria can be assigned a baseline harvest probability of zero regardless of other risk potential.

Validation and Verification Guidance Options

Validation

Validation activities may be performed in combination with the first verification of a project. The scope of validation assessment may include a desk-based review of the project's design in accordance with the requirements of this methodology (assessed at the scale of a grouped project, as applicable). The validator must conduct site visits to a representative sample of project instances selected through a risk-based sampling plan. Following the initial validation of a project, new instances may be added in subsequent activity periods. New instances should be reviewed in subsequent activity periods and may be chosen for sampling per risk-based sampling conducted by the validation and verification body.

The desk-based validation should assess the project's adherence to the methodology's applicability requirements, the geographic and temporal boundaries of the project, the GHG SSRs included in the project boundaries, baseline selection including justification of the inputs to the project specific BAU model deployed in the selection of the baseline, methods and development of the forest inventory including QA/QC requirements, quantification methods, uncertainty assessments, and data collection and management systems.

All instances included in an activity period are subject to potential sample selection by the validation body inclusive of a site visit to the participating property. Where an instance is selected for validation site visit, the validator may assess all or certain elements of the above project-level validation requirements at an instance level.

Verification

After the completion of an activity period and prior to VCU issuance, verification of the project may be performed via desk review and site visit(s) selected by the verification body based on risk-based sampling.

Verification must be designed to assess, in the project context, the ongoing adherence to the methodology's applicability requirements, the GHG SSRs included in the project boundaries, baseline selection including justification of the inputs to the project specific BAU model deployed in the selection of the baseline, methods and development of the forest inventory including QA/QC requirements and any updates/remodeling of the forest inventory, emission reduction calculations, uncertainty assessments, and data collection and management systems including any modification to these processes since the project's validation.

Projects utilizing this methodology may be structured, primarily, as grouped projects. Verifiers may select a subset of instances for site visits during each verification. This selection may be made based on a risk-based sample of instances included in an activity period with preference for the selection of instances within a subregion(s) of the program area that is representative of the project. The determination of an applicable subregion(s) from which to select site visit candidates is at the discretion of the verifier.

As a component of the verification site visit(s), verifiers may wish to resample carbon stocks at the instances chosen. This resampling can ensure statistical agreement between the carbon stocks measured by the project proponent during the end of activity period (t1) forest inventory and the carbon stocks measured by the verifier. These measurements should be paired (i.e. verifiers shall remeasure t1 inventory project sample plots) and carbon stocks should agree statistically, for example, at a 90% confidence interval using a t-test. Verifiers should select a minimum of 2% of project sample plots for remeasurement during each verification and, for stratified inventories, include sample plots chosen from all strata identified.

Implementation Options

It should be understood that the example embodiments described above may be implemented in many different ways. In some instances, the various "data processors" may each be implemented by a physical or virtual or cloud-based general purpose computer having a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., one or more central processing units, disks, various memories, input/output ports, network ports, etc.) that enables the transfer of information between the elements. One or more central processor units are attached to the system bus and provide for the execution of computer instructions. Also attached to system bus are typically I/O device interfaces for connecting the disks, memories, and various input and output devices. Network interface(s) allow connections to various other devices attached to a network. One or more memories provide volatile and/or non-volatile storage for computer software instructions and data used to implement an embodiment. Disks or other mass storage provides non-volatile storage for computer software instructions and data used to implement, for example, the various procedures described herein.

Embodiments may therefore typically be implemented in hardware, custom designed semiconductor logic, Application Specific Integrated Circuits (ASICs), Field Programmable Gate Arrays (FPGAs), firmware, software, or any combination thereof.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); storage including magnetic disk storage media; optical storage media; flash memory devices; and others.

The data processors that implement the functions and processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and often preferred as they allow multiple users to access computing. By aggregating demand from multiple users in central locations, cloud computing environments can be built using the best and newest technology, located in sustainable and/or centralized locations and designed to achieve the greatest per-unit efficiency possible.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and system diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

The above description has particularly shown and described example embodiments. However, it will be understood by those skilled in the art that various changes in form and details may be made therein without departing from the legal scope of this patent as encompassed by the appended claims.

REFERENCES

Abbas, D., Clatterbuck, W., 2015. A Survey Analysis of Harvesting Logistics in Tennessee. European Journal of Forest Engineering 1, 84-92.

Belair, E. P., Ducey, M. J., 2018. Patterns in Forest Harvesting in New England and New York: Using FIA Data to Evaluate Silvicultural Outcomes. Journal of Forestry 116, 273-282. https://doi.org/10.1093/jofore/fvx019

Bechtold, W. A. and Patterson, P. L., 2005. The enhanced forest inventory and analysis program-national sampling design and estimation procedures (Vol. 80). USDA Forest Service, Southern Research Station.

Butler, Brett J. 2021. America's family forest owners. Society of American Foresters, Washington, D.C.

Butler, B. J., Butler, S. M., Caputo, J., Dias, J., Robillard, A., Sass, E. M., 2021. Family Forest Ownerships of the United States, 2018: Results from the USDA Forest Service, National Woodland Owner Survey (No. GTR-199). USDA Forest Service.

Butler, B. J., Caputo, J., 2021. Weighting for the USDA Forest Service, National Woodland Owner Survey (No. NRS-GTR-198). U.S. Department of Agriculture, Forest Service, Northern Research Station, Madison, Wis. https://doi.org/10.2737/NRS-GTR-198 Canham, C. D., Rogers, N., Buchholz, T., 2013. Regional variation in forest harvest regimes in the northeastern United States. Ecological Applications 23, 515-522. https://doi.org/10.1890/12-0180.1

FAO, 2021. Historical Timber Product Export Prices. UNECE FAO.

Faustmann, M. 1849. Calculation of the Value Which Forest Land and Immature Stands Possess for Forestry. Allgemeine Forstund Jagdzeitung, 15:441-55.

Gray, A. N., Brandeis, T. J., Shaw, J. D., McWilliams, W. H., & Miles, P. 2012. Forest inventory and analysis database of the United States of America (FIA). In: Dengler, J.; Oldeland, J.; Jansen, F.; Chytry, M.; Ewald, J., Finckh, M.; Glockler, F.; Lopez-Gonzalez, G.; Peet, R K; Schaminee, J. H J, eds. Vegetation databases for the 21st century. Biodiversity and Ecology. 4: 225-231., 225-231.

Gray, Andrew N., et al. Forest Inventory and Analysis Database of the United States of America (FIA). 2012, p. 8.

Heath, L. S., Hansen, M., Smith, J. E., Miles, P. D., 2009. Investigation into Calculating Tree Biomass and Carbon in the FIADB Using a Biomass Expansion Factor Approach.

Hiraishi, Taka, Buruhani Nyenzi, Jim Penman, et al. "Chapter 6—QUANTIFYING UNCERTAINTIES IN PRACTICE." IPCC Good Practice Guidance and Uncertainty Management in National Greenhouse Gas Inventories, edited by Richard Odingo, IPCC, 2000, p. 22.

Hudiburg, T. Law, B. Moomaw, W. Harmon, M. and Stenzel, J (2019) Meeting GHG Reduction Targets Requires Accounting for All Forest Sector Emissions. Environmental Research Letters, 14 095005.

Jenkins, J. C., Chojnacky, D. C., Heath, L. S., Birdsey, R. A., 2004. Comprehensive Database of Diameter-based Biomass Regressions for North American Tree Species.

Luppold, W., Bumgardner, M. S., 2018. TIMBER HARVESTING PATTERNS FOR MAJOR STATES IN THE CENTRAL, NORTHERN, AND MID-ATLANTIC HARDWOOD REGIONS. W&FS 50, 143-153. https://doi.org/10.22382/wfs-2018-016

McMahon, G., Gregonis, S. M., Waltman, S. W., Omernik, J. M., Thorson, T. D., Freeouf, J. A., Rorick, A. H. and Keys, J. E., 2001. Developing a spatial framework of common ecological regions for the conterminous United States. Environmental Management, 28(3), pp. 293-316.

Milauskas, S. J., Wang, J., 2006. West Virginia logger characteristics. Forest Products Journal 56, 6.

Miles, P. Smith, W. (2009) Specific Gravity and Other Properties of Wood and Bark for 156 Tree Species Found in North America. Res. Note NRS-38. U.S. Department of Agriculture, Forest Service, Northern Research Station. 35 p.

Murray, B. McCarl, B. and Lee, H. (2004) Estimating Leakage from Forest Carbon Sequestration Programs. Land Economics. Vol 80 No. 1: 109-124

OpenStreetMap contributors. North America OSM Data Extract. Geofabrik GmbH, August 2021, https://www.openstreetmap.org.

Ospina, R., Ferrari, S. L. P., 2010. Inflated Beta Distributions. Stat Papers 51, 111-126. https://doi.org/10.1007/s00362-008-0125-4

Pokharel, R. and Latta, G. S., 2020. A network analysis to identify forest merchantability limitations across the United States. Forest Policy and Economics, 116, p. 102181

Polyakov, M., Wear, D. N., Huggett, R. N., 2010. Harvest Choice and Timber Supply Models for Forest Forecasting. Forest Science 56, 344-355.

Prestemon, J. P. and Wear, D. N., 2000. Linking harvest choices to timber supply. Forest Science, 46(3), pp. 377-389.

Pugh, Scott A.; Turner, Jeffery A.; Burrill, Elizabeth A.; David, Winnie. 2018. The Forest Inventory and Analysis Database: population estimation user guide (Edition: November, 2018). U.S. Department of Agriculture, Forest Service. 166 p. [Online]. Available at web address: http://www.fia.fs.fed.us/library/database-documentation/

Roesch, F. A., Van Deusen, P. C., 2012. Monitoring forest/non-forest land use conversion rates with annual inventory data. Forestry 85, 391-398. https://doi.org/10.1093/forestry/ops037

Raile, G. (1982) Estimating Stump Volume. Research Paper NC-224. U.S. Dept. of Agriculture, Forest Service, North Central Forest Experiment Station.

Sass, E. M., Butler, B. J. and Markowski-Lindsay, M., 2020. Distribution of forest ownerships across the conterminous United States, 2017. Res. Map NRS-11. Madison, Wis.: US Department of Agriculture, Forest Service, Northern Research Station, 11.

Stanke, H., Finley, A. O., Weed, A. S., Walters, B. F., Domke, G. M., 2020. rFIA: An R package for estimation of forest attributes with the US Forest Inventory and Analysis database. Environmental Modelling & Software 127, 104664. https://doi.org/10.1016/j.envsoft.2020.104664

Stanke, H., Finley, A. O., & Domke, G. M. 2021. Simplifying small area estimation with rFIA: a demonstration of tools and techniques. arXiv preprint arXiv:2109.03863.

Thompson, J. R., Canham, C. D., Morreale, L., Kittredge, D. B. and Butler, B., 2017. Social and biophysical variation in regional timber harvest regimes. Ecological Applications, 27(3), pp. 942-955.

Thompson, Jonathan R., et al. "Social and Biophysical Variation in Regional Timber Harvest Regimes." Ecological Applications, vol. 27, no. 3, April 2017, pp. 942-55. DOI.org (Crossref), https://doi.org/10.1002/eap. 1497.

US Bureau of Labor Statistics, 2021. PPI Commodity data for Lumber and wood products-Logs, bolts, timber, pulpwood and wood chips, not seasonally adjusted (No. WPU085). United States Department of Labor.

U.S. Geological Survey (USGS) Gap Analysis Project (GAP), 2021, Protected Areas Database of the United States (PAD-US) 2.1 Summary Statistics by GAP Status Code: U.S. Geological Survey data release, https://doi.org/10.5066/P9KJLB3Q.

Woodall, C. W., Heath, L. S., Domke, G. M. and Nichols, M. C., 2011. Methods and equations for estimating aboveground volume, biomass, and carbon for trees in the US forest inventory, 2010.

Winjum, J. K., Brown, S. and Schlamadinger, B. 1998. Forest harvests and wood products: sources and sinks of atmospheric carbon dioxide. Forest Science 44: 272-284

Zhang, D., Sun, X., Butler, B. J. and Prestemon, J. P., 2015. Harvesting choices and timber supply among landowners in the Southern United States. Canadian Journal of Agricultural Economics/Revue canadienne d'agroeconomie, 63(3), pp. 409-429.

The invention claimed is:

1. A method for on-demand estimation of potential carbon credit production for a forested area during an activity period comprising:
   receiving a boundary description and other information about the forested area from a participant;
   querying one or more databases to obtain spatially explicit data about trees in the forested area;
   estimating carbon content for the forested area from at least the spatially explicit data;
   determining a baseline scenario model for the forested area using a carbon crediting protocol including models of potential carbon credit production from the estimate of carbon content and a model of a forest management practice that includes at least a risk of removal from harvest during the activity period,
   determining an alternate scenario model under which forested area could generate different carbon credits during the activity period;
   wherein the risk of removal from harvest depends on a probability that the forested area will be harvested during the activity period in the absence of implementing the alternate scenario;
   determine the potential carbon credit production from the estimates of carbon content, the baseline scenario model, and the alternate scenario model;
   return information related to the potential carbon credit production to the participant;
   receiving notification that the participant commits to implementing the alternate scenario for the activity period in exchange for tradeable credits;
   after the activity period:
      validating that the alternate scenario was implemented, by verifying subsequent carbon content for the forested area; and
      generating a request to a carbon crediting service to generate the tradeable credits based on the subsequent carbon content.

2. The method of claim 1 wherein the risk of removal from harvest is further a function of one or more of stand volume, stand value at a start time, stand value at an end time, proximity to mill, stand slope, proximity to road, owner type, forest type, forest class, and historical harvest disturbance.

3. The method of claim 1 wherein the baseline scenario model is a Bayesian hierarchical model.

4. The method of claim 1 wherein the estimate of carbon content for the forested area is determined without field measurements.

5. The method of claim 1 wherein the information related to forest carbon credits is returned to the participant via a user interface.

6. The method of claim 1 wherein the spatially explicit data is derived from satellite imagery.

7. The method of claim 1 wherein the spatially explicit data for the forested area comprises a base map including one or more of property boundaries, tree counts, tree diameters, species, and species density.

8. The method of claim 1 wherein the alternate scenario comprises determining a risk of removal during the activity period as a function of one or more of timber value, non-timber value, cost of harvest, and landowner type.

9. The method of claim 1 wherein the alternate scenario model additionally depends on net Green House Gas (GHG) emission reduction.

10. The method of claim 3 wherein the Bayesian hierarchical model accommodates simultaneous estimation of each enumerated parameter of a zero one inflated beta (ZOIB) mixture model.

11. A system for on-demand estimation of potential carbon credit production for a forested area during an activity period, the system comprising:
   a computing platform having one or more processors and one or more computer readable storage devices;
   program instructions embodied by the one or more one computer readable storage devices, the program instructions causing one or more of the processors, when executed, to:
   receive a boundary description and other information about the forested area from a participant;
   query one or more databases to obtain spatially explicit data about trees in the forested area;
   estimate carbon content for the forested area from at least the spatially explicit data;
   determine a baseline scenario model for the forested area using a carbon crediting protocol including models of potential carbon credit production from the estimate of carbon content and a model of a forest management practice that includes at least a risk of removal from harvest during the activity period;
   determine an alternate scenario model under which forested area could generate different carbon credits during the activity period;
   wherein the risk of removal from harvest depends on a probability that the forested area will be harvested during the activity period in the absence of implementing the alternate scenario;
   determine the potential carbon credit production from the estimates of carbon content, the baseline scenario model, and the alternate scenario model;
   return information related to the potential carbon production to the participant;
   receiving notification that the participant commits to implementing the alternate scenario for the activity period in exchange for tradeable credits;
   after the activity period:
      validating that the alternate scenario was implemented, by verifying subsequent carbon content for the forested area; and generating a request to a carbon crediting service to generate the tradeable credits based on the subsequent carbon content.

12. The system of claim 11 wherein the risk of removal from harvest is further a function of one or more of stand volume, stand value at a start time, stand value at an end time, proximity to mill, stand slope, proximity to road, owner type, forest type, forest class, and historical harvest disturbance.

13. The system of claim 11 wherein the baseline scenario model is a Bayesian hierarchical model.

14. The system of claim 11 wherein the estimate of carbon content for the forested area is determined without field measurements.

15. The system of claim 11 wherein the information related to forest carbon credits is returned to the participant via a user interface.

16. The system of claim 11 wherein the spatially explicit data is derived from satellite imagery.

17. The system of claim 11 wherein the spatially explicit data for the forested area comprises a base map including one or more of property boundaries, tree counts, tree diameters, species, and species density.

18. The system of claim 11 wherein the alternate scenario comprises determining a risk of removal during the activity period as a function of one or more of timber value, non-timber value, cost of harvest, and landowner type.

19. The system of claim 11 wherein the alternate scenario model additionally depends on net GHG emission reduction.

20. The system of claim 13 wherein the Bayesian hierarchical model accommodates simultaneous estimation of each enumerated parameter of a zero one inflated beta (ZOIB) mixture model.

* * * * *